United States Patent
Sung et al.

(10) Patent No.: US 11,416,742 B2
(45) Date of Patent: Aug. 16, 2022

(54) AUDIO SIGNAL ENCODING METHOD AND APPARATUS AND AUDIO SIGNAL DECODING METHOD AND APPARATUS USING PSYCHOACOUSTIC-BASED WEIGHTED ERROR FUNCTION

(71) Applicants: Electronics and Telecommunications Research Institute, Daejeon (KR); THE TRUSTEES OF INDIANA UNIVERSITY, Bloomington, IN (US)

(72) Inventors: Jongmo Sung, Daejeon (KR); Minje Kim, Bloomington, IN (US); Aswin Sivaraman, Bloomington, IN (US); Kai Zhen, Bloomington, IN (US)

(73) Assignees: Electronics and Telecommunications Research Institute, Daejeon (KR); THE TRUSTEES OF INDIANA UNIVERSITY, Bloomington, IN (US)

( * ) Notice: Subject to any disclaimer, the term of this patent is extended or adjusted under 35 U.S.C. 154(b) by 1016 days.

(21) Appl. No.: 16/122,708

(22) Filed: Sep. 5, 2018

(65) Prior Publication Data
US 2019/0164052 A1 May 30, 2019

Related U.S. Application Data

(60) Provisional application No. 62/590,488, filed on Nov. 24, 2017.

(30) Foreign Application Priority Data

Dec. 15, 2017 (KR) .................... 10-2017-0173405

(51) Int. Cl.
*G06N 3/08* (2006.01)
*G10L 19/008* (2013.01)
(Continued)

(52) U.S. Cl.
CPC .............. *G06N 3/08* (2013.01); *G10L 19/008* (2013.01); *G10L 19/032* (2013.01); *G10L 25/30* (2013.01); *G10L 25/69* (2013.01)

(58) Field of Classification Search
CPC ....................................................... G06N 3/08
See application file for complete search history.

(56) References Cited

U.S. PATENT DOCUMENTS 6,035,177 A * 3/2000 Moses .................... H04H 20/31
380/252
7,921,007 B2 * 4/2011 Van de Par ........... G10L 21/038
704/229

(Continued)

OTHER PUBLICATIONS

Liu et al., A Perceptually-Weighted Deep Neural Network for Monaural Speech Enhancement in Various Background Noise Conditions, 2017 25th European Signal Processing Conference (EUSIPCO), Aug. 28, 2017, pp. 1-5, IEEE, Kos, Greece.

*Primary Examiner* — Olisa Anwah
(74) *Attorney, Agent, or Firm* — William Park & Associates Ltd.

(57) ABSTRACT

Provided is a training method of a neural network that is applied to an audio signal encoding method using an audio signal encoding apparatus, the training method including generating a masking threshold of a first audio signal before training is performed, calculating a weight matrix to be applied to a frequency component of the first audio signal based on the masking threshold, generating a weighted error function obtained by correcting a preset error function using the weight matrix, and generating a second audio signal by applying a parameter learned using the weighted error function to the first audio signal.

7 Claims, 11 Drawing Sheets

(51) Int. Cl.
  *G10L 19/032*  (2013.01)
  *G10L 25/30*  (2013.01)
  *G10L 25/69*  (2013.01)

(56) References Cited

U.S. PATENT DOCUMENTS

| | | | |
|---|---|---|---|
| 8,588,427 B2* | 11/2013 | Uhle | H04R 5/04 |
| | | | 381/17 |
| 10,043,527 B1* | 8/2018 | Gurijala | G10L 19/018 |
| 2003/0115042 A1* | 6/2003 | Chen | G10L 25/69 |
| | | | 704/E19.002 |
| 2004/0002859 A1* | 1/2004 | Liu | G10L 19/035 |
| | | | 704/229 |
| 2008/0082328 A1 | 4/2008 | Lee | |
| 2009/0089049 A1* | 4/2009 | Moon | G10L 19/035 |
| | | | 704/E19.001 |
| 2010/0076769 A1 | 3/2010 | Yu | |
| 2011/0026724 A1* | 2/2011 | Doclo | G10K 11/17854 |
| | | | 381/71.8 |
| 2011/0119039 A1* | 5/2011 | Grancharov | G10L 25/69 |
| | | | 703/2 |
| 2012/0020415 A1* | 1/2012 | Yang | H04N 17/004 |
| | | | 375/E7.279 |
| 2012/0023051 A1* | 1/2012 | Pishehvar | G06N 3/049 |
| | | | 706/21 |
| 2012/0093341 A1 | 4/2012 | Kim et al. | |
| 2015/0003625 A1 | 1/2015 | Uhle et al. | |
| 2016/0078880 A1 | 3/2016 | Avendano et al. | |
| 2016/0247502 A1 | 8/2016 | Park et al. | |
| 2020/0234720 A1* | 7/2020 | Sung | G10L 19/0017 |
| 2020/0329330 A1* | 10/2020 | Mitchell | H04R 29/007 |

\* cited by examiner

AUDIO SIGNAL ENCODING METHOD AND APPARATUS AND AUDIO SIGNAL DECODING METHOD AND APPARATUS USING PSYCHOACOUSTIC-BASED WEIGHTED ERROR FUNCTION

CROSS-REFERENCE TO RELATED APPLICATION(S)

This application claims the benefit under 35 U.S.C. § 119(e) of U.S. Provisional Application No. 62/590,488 filed on Nov. 24, 2017 in the U.S. Patent and Trademark Office, and claims the benefit under 35 U.S.C. § 119(a) of Korean Patent Application No. 10-2017-0173405 filed on Dec. 15, 2017 in the Korean Intellectual Property Office, the entire disclosures of which are incorporated herein by reference for all purposes.

BACKGROUND

1. Field

One or more example embodiments relate to audio signal encoding method and apparatus and audio signal decoding method and apparatus using a psychoacoustic-based weighted error function, and more particularly, to audio signal encoding method and apparatus and audio signal decoding method and apparatus reflecting a parameter learned using a weighted error function based on a human auditory characteristic.

2. Description of Related Art

Recently, voice and audio codecs for various purposes and applications have been developed in standardization organizations such as International Telecommunication Union Telecommunication Standardization Sector (ITU-T), Moving Picture Experts Group (MPEG), and the $3^{rd}$ Generation Partnership Project (3GPP). Most audio codecs are based on psychoacoustic models using various human auditory characteristics. The voice codec is mainly based on the voice generation model, but at the same time, utilizes human cognitive characteristics to improve a subjective quality.

As such, in a related art, the voice and audio codecs may employ a human auditory characteristic-based method to effectively control quantization noise generated in a process of encoding.

SUMMARY

An aspect provides an enhanced quality of an audio signal with the same model complexity using a perceptually weighted error function based on human auditory characteristics.

Another aspect also provides the same level of quality of an audio signal with a lower model complexity using a perceptually weighted error function based on human auditory characteristics.

According to an aspect, there is provided a training method of a neural network that is applied to an audio signal encoding method using an audio signal encoding apparatus, the training method including generating a masking threshold of a first audio signal before training is performed, calculating a weight matrix to be applied to a frequency component of the first audio signal based on the masking threshold, generating a weighted error function obtained by correcting a preset error function using the weight matrix, and generating a second audio signal by applying a parameter learned using the weighted error function to the first audio signal.

The weight matrix may include a weight to be applied to the frequency component of the first audio signal, and the weight may be set to be inversely proportional to the masking threshold of the first audio signal and proportional to a magnitude of the frequency component of the first audio signal.

The training method may further include comparing the second audio signal to the first audio signal and performing a perceptual quality evaluation.

The perceptual quality evaluation may include an objective evaluation based on a perceptual evaluation of speech quality (PESQ), a perceptual objective listening quality assessment (POLQA), or a perceptual evaluation of audio quality (PEAQ), and a subjective evaluation based on a mean opinion score (MOS) or multiple stimuli with hidden reference and anchor (MUSHRA).

The neural network may determine whether a topology included in a model is adjustable based on the perceptual quality evaluation.

When determining whether the topology is adjustable, the neural network may re-learn a parameter using a complexity-increased model in response to a result of the perceptual quality evaluation not satisfying a preset quality requirement and, in response to a result of the perceptual quality evaluation satisfying a preset quality requirement, re-learn a parameter using a complexity-reduced model in the quality requirement.

According to another aspect, there is also provided an audio signal encoding method performed by an audio signal encoding apparatus to which a neural network is applied, the method including receiving an input audio signal, generating a latent vector having a reduced dimension, of the input audio signal based on a parameter of a hidden layer learned using the neural network, wherein the neural network includes at least one hidden layer, and encoding the latent vector and outputting a bitstream.

The generating of the latent vector may include generating the latent vector based on the learned parameter when an adjustment of a topology of a model including a number of hidden layers and a number of nodes is not possible or needed, or generating the latent vector based on a parameter re-learned by applying an adjusted topology when the topology of the model is adjustable.

The encoding of the latent vector may include performing a binarization to transmit the bitstream through a channel.

According to still another aspect, there is also provided a training method of a neural network that is applied to an audio signal decoding method using an audio signal decoding apparatus, the training method including generating a masking threshold of a first audio signal before training is performed, calculating a weight matrix to be applied to a frequency component of the first audio signal based on the masking threshold, generating a weighted error function obtained by correcting a preset error function using the weight matrix, and generating a second audio signal by applying a parameter learned using the weighted error function to the first audio signal.

The weight matrix may include a weight to be applied to the frequency component of the first audio signal, and the weight may be set to be inversely proportional to the masking threshold of the first audio signal and proportional to a magnitude of the frequency component of the first audio signal.

The training method may further include comparing the second audio signal to the first audio signal and performing a perceptual quality evaluation.

The perceptual quality evaluation may include an objective evaluation based on a perceptual evaluation of speech quality (PESQ), a perceptual objective listening quality assessment (POLQA), or a perceptual evaluation of audio quality (PEAQ), and a subjective evaluation based on a mean opinion score (MOS) or multiple stimuli with hidden reference and anchor (MUSHRA).

The neural network may determine whether a topology included in a model is adjustable based on the perceptual quality evaluation.

When determining whether the topology is adjustable, the neural network may re-learn a parameter using a complexity-increased model in response to a result of the perceptual quality evaluation not satisfying a preset quality requirement and, in response to a result of the perceptual quality evaluation satisfying a preset quality requirement, re-learn a parameter using a complexity-reduced model in the quality requirement.

According to yet another aspect, there is also provided an audio signal decoding method performed by an audio signal decoding apparatus to which a neural network is applied, the method including receiving a bitstream obtained by encoding a latent vector that is generated by applying a parameter learned through the neural network to an input audio signal, restoring the latent vector from the received bitstream, and decoding an output audio signal from the restored latent vector using a hidden layer to which the learned parameter is applied, wherein the neural network includes at least one hidden layer.

The latent vector may be generated based on the learned parameter when an adjustment of a topology including a number of hidden layers and a number of nodes included in the hidden layer is not possible or needed, and the latent vector may be generated based on a parameter re-learned by applying an adjusted topology when the topology is adjustable.

The latent vector may be encoded by performing a binarization to transmit the bitstream through a channel.

According to further another aspect, there is also provided an audio signal encoding apparatus to which a neural network is applied, the apparatus including a processor and a memory storing at least one instruction to be executed by the processor, wherein when the at least one instruction is executed in the processor, the processor is configured to receive an input audio signal, generate a latent vector having a reduced dimension, of the input audio signal based on a parameter of a hidden layer learned using the neural network, wherein the neural network includes at least one hidden layer, encode the latent vector, and output a bitstream.

According to still another aspect, there is also provided an audio signal decoding apparatus, the apparatus including a processor and a memory storing at least one instruction to be executed by the processor, wherein when the at least one instruction is executed in the processor, the processor is configured to generate a masking threshold of a first audio signal before training is performed, calculate a weight matrix to be applied to a frequency component of the first audio signal based on the masking threshold, generate a weighted error function obtained by correcting a preset error function using the weight matrix, and generate a second audio signal by applying a parameter learned using the weighted error function to the first audio signal.

According to an aspect, it is possible to provide an enhanced quality of an audio signal with the same model complexity using a perceptually weighted error function based on human auditory characteristics.

According to another aspect, it is possible to provide the same level of quality of an audio signal with a lower model complexity using a perceptually weighted error function based on human auditory characteristics.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
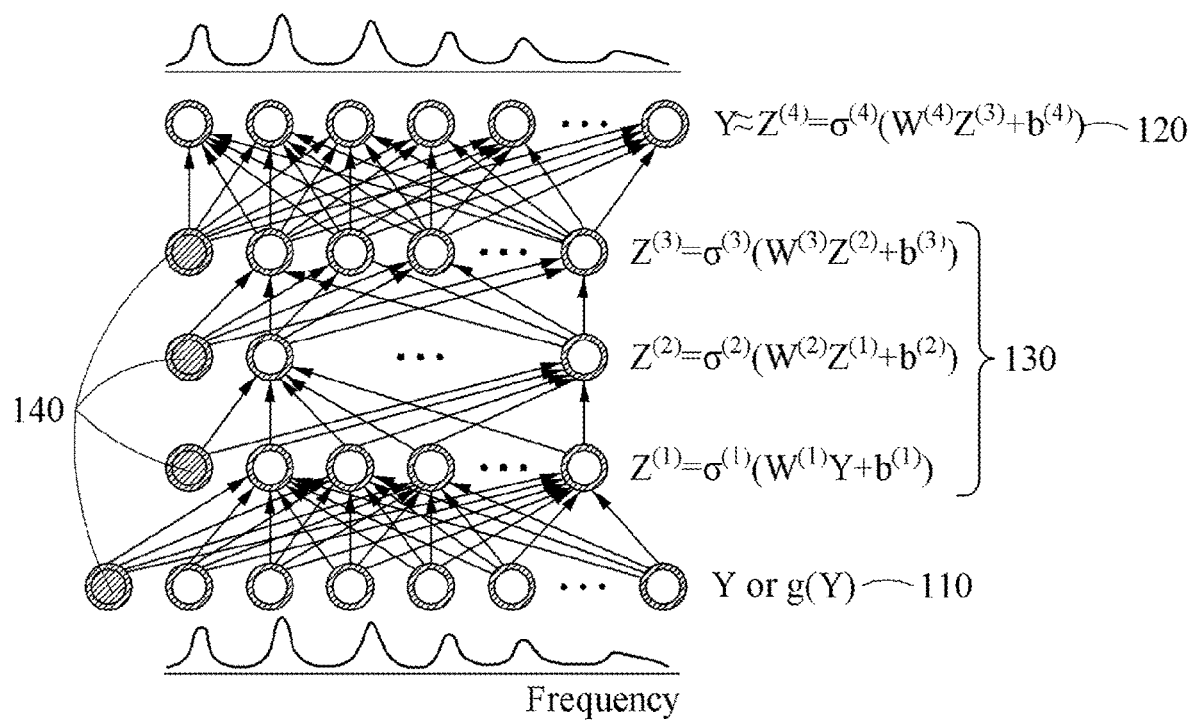
FIG. 1 is a diagram illustrating an autoencoder including three hidden layers according to an example embodiment.

FIG. 1 is a diagram illustrating an autoencoder including three hidden layers according to an example embodiment.

Referring to FIG. 1, audio signal encoding and decoding may be performed by applying a neural network. The neural network may include various models of deep learning and machine learning. For example, the neural network may include an autoencoding method as a model of the deep learning, convolutional autoencoders, recurrent neural networks including Long Short-Term Memory (LSTM) networks and Gated Recurrent Units (GRU). Also, other machine learning models that are learned to reproduce the input audio for the coding purpose or to improve the input audio for another purpose can all benefit from the proposed invention.

The neural network or any other machine learning models may use optimization techniques that minimize an error function or cost function. The optimization may be performed based on an iterative learning algorithm. Through the optimization, a parameter that minimizes an error may be acquired.

For example, input data to which the neural network is applied may be used to predict output data as shown in Equation 1. In Equation 1, $X \in \mathbb{R}^{D \times N}$ denotes N items of D-dimensional input data, $Z \in \mathbb{R}^{R \times N}$ denotes N items of R-dimensional output data, and a parameter $\Theta'$ represents a model of a neural network applied to input data.

$$Z = \mathcal{F}(X;\Theta).$$ [Equation 1]

A difference between predicted output data $Z \in \mathbb{R}^{R \times N}$ and target data $Y \in \mathbb{R}^{R \times N}$ may correspond to an error and an error function is defined as shown in Equation 2. The target data $Y \in \mathbb{R}^{R \times N}$ may be N items of R-dimensional target data.

$$\varepsilon(Y_{i,n} \| Z_{i,n})$$ [Equation 2]

In Equation 2, $Y_{i,n}$ and $Z_{i,n}$ denote n-th column vectors of target data and output data, respectively. A total error may be calculated for N items of data using Equation 3.

$$\Sigma_{n=1}^{N} \varepsilon(Y_{i,n} \| Z_{i,n})$$ [Equation 3]

Thus, a parameter may be adjusted to minimize the total error. A parameter that minimizes the total error may be acquired using the iterative learning algorithm. The iterative learning algorithm may be performed by various neural network models. For example, the autoencoding method may be used for learning latent patterns from the input data.

Hereinafter, a neural network to which the autoencoding method is applied will be described. However, embodiments are not limited thereto. Instead, a model that is optimized to reduce the error between the target audio spectra and the predicted output may also be used.

In terms of an autoencoder, target data Y and input data X may have the same size and thus, may be effective for reducing a dimension. When the autoencoder includes L hidden layers, a fully-connected deep autoencoder may be defined recursively as shown in Equation 4 below.

$$\mathcal{F}(X;\Theta) = \sigma^{(L+1)}(W^{(L+1)}Z^{(L)} + b^{(L+1)})$$

$$Z^{(L)} = \sigma^{(L)}(W^{(L)}Z^{(L-1)} + b^{(L)})$$

$$\ldots,$$

$$Z^{(l)} = \sigma^{(l)}(W^{(l)}Z^{(l-1)} + b^{(l)})$$

$$\ldots,$$

$$Z^{(1)} = \sigma^{(1)}(W^{(1)}Z + b^{(1)})$$

In Equation 4, $W^{(l)}$ and $b^{(l)}$ respectively denote a weighting and a bias of an l-'th layer. In this example, a parameter $\Theta'$ may indicate $\{W^{(1)}, W^{(2)}, \ldots, W^{(L+1)}, b^{(1)}, b^{(2)}, \ldots, b^{(L+1)}\}$.

FIG. 1 is a diagram illustrating an autoencoder including three hidden layers according to an example embodiment. Referring to FIG. 1, a bottom layer 110 may be an input layer at which data is input, a top layer 120 may be an output layer at which the data is output, and intermediate layers may be hidden layers 130. Also, nodes may be included in the input layer, the output layer, and the hidden layer. Nodes 140 may be biased nodes.

An autoencoder may be a compression system including an encoder including an input layer and hidden layers 1 and 2, and a decoder including a hidden layer 3 and an output layer. The hidden layer 2 may be a code layer used to compress the input data.

If $K^l \ll D$, the encoder of the autoencoder that is the compression system may generate a dimension-reduced $Z^{(l)} \in \mathbb{R}^{K^l \times N}$ in the code layer. Also, the decoder of the autoencoder may restore the input data from $Z^{(l)}$ using an error function set as shown in Equation 5 with respect to the target data Y and the input data X.

$$\mathrm{argmin}_{\Theta}\{\Sigma_{n=1}^{N} \varepsilon(Z_{i,n} \| Z_{i,n}^{(L+1)})\} = \mathrm{argmin}_{\Theta} \{\Sigma_{n=1}^{N} \varepsilon(X_{i,n} \| \mathcal{F}(X_{i,n};\Theta))\}$$

To achieve an increased efficiency in the code layer, the number of the other hidden layers and the number of the nodes included in those hidden layers may increase. In this example, a complexity of the autoencoder and a quality of the output data may be in a trade-off relationship. Thus, a high complexity of the autoencoder may cause battery consumption and memory shortage.

Also, the autoencoder may be, for example, a denoising autoencoder for generating a clean signal by removing noise from a noisy signal that is transformed due to noise. The noise may include additive noise, reverberation, and bandpass filtering.

The denoising autoencoder generating the clean signal from the noisy signal may be expressed as shown in Equation 6 below. In Equation 6, Y denotes a size spectrum of the clean signal and X denotes a size spectrum of the noisy signal. Here, X may also be expressed as $\mathcal{G}(Y)$ using a transformation function $\mathcal{G}(.)$. In Equation 6, $\mathcal{F}$ is obtained by approximating an inverse function of the transformation and, for example, $\mathcal{F}(X) \approx \mathcal{G}^{-1}(X)$.

$$Y \approx \mathcal{F}(X;\Theta).\qquad\text{[Equation 6]}$$

When the clean signal is transformed due to the additive noise, as shown in Equation 7, the denoising autoencoder may be trained to estimate an ideal mask $M \in \mathbb{R}^{D \times N}$ for removing the additive noise instead of directly estimating the clean signal.

$$\overline{M} \approx \mathcal{F}(X;\Theta).\qquad\text{[Equation 7]}$$

The ideal mask may be used to remove the additive noise of the noise signal using a Hadamard multiplication as shown in Equation 8.

$$Y \approx \overline{M} \odot X\qquad\text{[Equation 8]}$$

In Equation 8, $\overline{M}$ may be an ideal ratio mask and expressed as shown in Equation 9. In Equation 9, Q denotes a size spectrum of the additive noise. When the clean signal is transformed due to the additive noise, a transformation function may be defined as shown in Equation 10.

$$M = \frac{Y^2}{Y^2 + Q^2}\qquad\text{[Equation 9]}$$

$$\mathcal{G}(Y) = Y + Q.\qquad\text{[Equation 10]}$$

The denoising autoencoder may learn a function $\mathcal{F}$ using a similar structure as Equation 4. Because a transformation function $\mathcal{G}$ is relatively complex, the large number of hidden layers and nodes may be required. Thus, a trade-off may occur between a performance and a complexity of a model.

As to the trade-off, an autoencoding method based on an error function using a human auditory characteristic will be described in detail below. By applying the human auditory characteristic, a model complexity may be reduced or a performance of an autoencoder may be improved.

Figure 2:
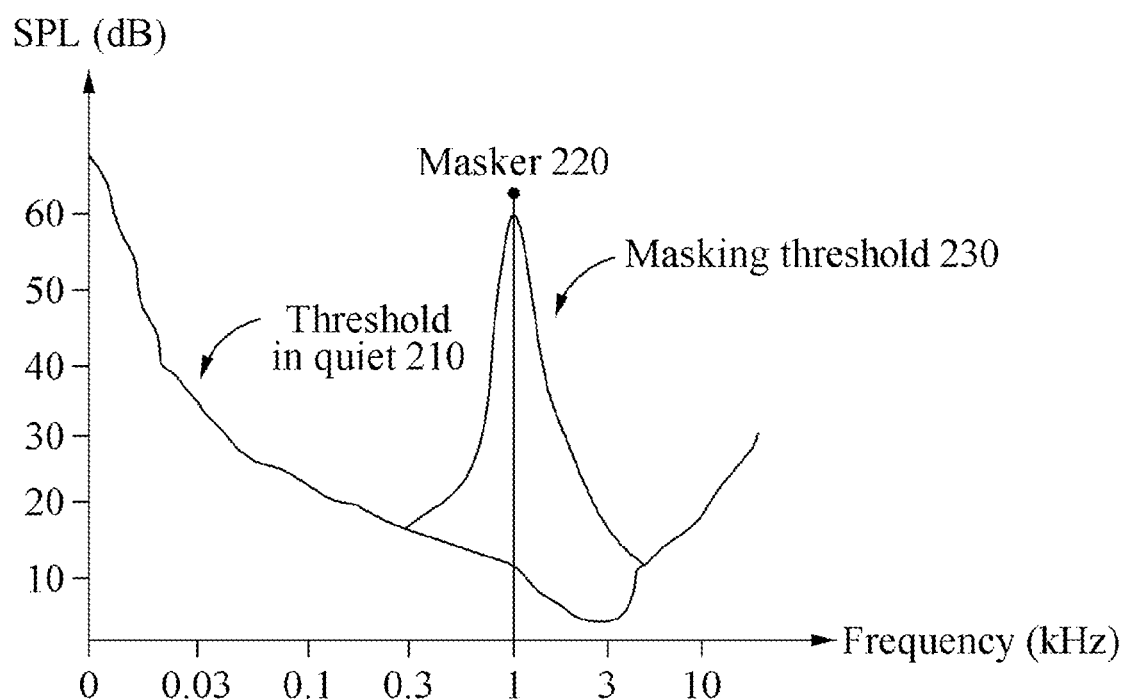
FIG. 2 is a diagram illustrating a simultaneous masking effect according to an example embodiment.

FIG. 2 is a diagram illustrating a simultaneous masking effect according to an example embodiment.

A graph 210 shows an audible sound pressure level in decibels (dB) based on a frequency of an audio signal in a quiet environment. For example, the audible sound pressure level may be lowest in a 4 kilohertz (kHz) frequency band. Also, a threshold of the audible sound pressure may increase as a frequency band is lower or higher. For example, most people may not recognize a relatively large tonal signal of about 30 dB at 30 hertz (Hz) but may recognize a relatively small tonal signal of about 10 dB at 1 kHz.

A graph 230 is a graph corrected by a tonal signal present at 1 kHz. The tonal signal may raise the graph 210 at 1 kHz. Thus, a signal smaller than the graph 230 may not be recognized by a person.

A masker 220 may be the tonal signal present at 1 kHz. A maskee may be a signal that is masked by the masker 220. For example, the maskee may include a signal smaller than the graph 230.

Figure 3:
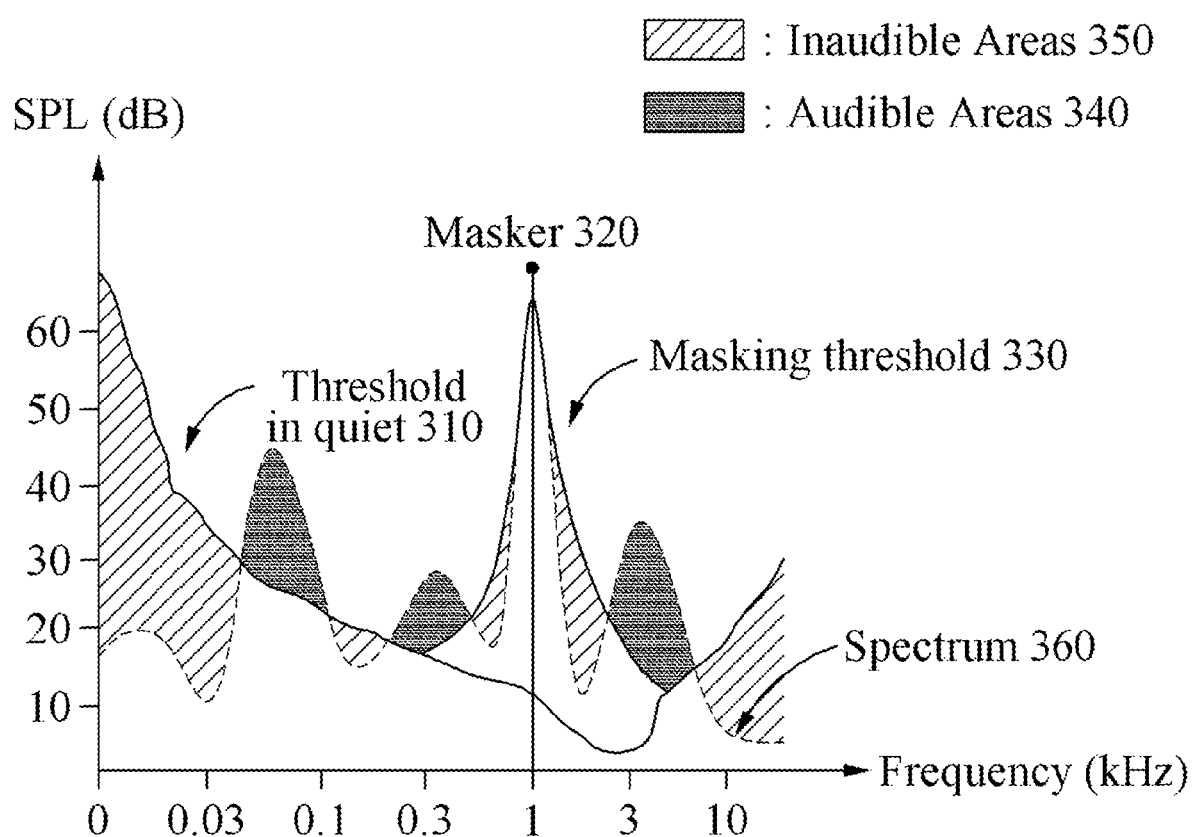
FIG. 3 is a diagram illustrating an audible area and an inaudible area based on a masking effect according to an example embodiment.

FIG. 3 is a diagram illustrating an audible area and an inaudible area based on a masking effect according to an example embodiment.

FIG. 3 illustrates a spectrum of an input audio signal superimposed on the graphs of FIG. 2. An audible area 340 may indicate that a spectrum 360 of an input audio signal has a spectrum greater than a masking threshold at a corresponding frequency. An inaudible area 350 may indicate that the spectrum 360 of the input audio signal has a spectrum less than the masking threshold at the corresponding frequency.

For example, at 30 Hz, a graph 310 is greater than a graph of the spectrum 360 and thus, may correspond to the inaudible area 350. In addition, at 10 kHz, the graph 310 is greater than the graph of the spectrum 360 and thus, may correspond to the inaudible area 350. Also, at 4 kHz, the graph 310 is less than the graph of the spectrum 360 and thus, may correspond to the audible area 340.

An error function may be corrected to take more consideration into an audible area than an inaudible area based on a characteristic of the input audio signal in a training of an autoencoder. When a magnitude of a predetermined frequency component of the input audio signal is less than a corresponding masking threshold, a person may be relatively insusceptible for an error. When a magnitude of a predetermined frequency component of the input audio signal is greater than a corresponding masking threshold, a person may be relatively susceptible for an error.

Thus, for the training of the autoencoder reflecting a human auditory characteristic, a corrected error function may be expressed as shown in Equation 11. The corrected error function may be a weighted error function obtained by correcting a preset error function.

$$\mathcal{J} = \sum_{n=1}^{N} \sum_{d=1}^{D} H_{d,n} \varepsilon(Y_{d,n} \| Z_{d,n})\qquad\text{[Equation 11]}$$

In Equation 11, H denotes a weight matrix. The weight matrix may include a weight to be applied to a frequency component of the input audio signal. For example, when a d-th coefficient of an n-th sample has a large masking threshold, a corresponding weight $H_{d,n}$ may be relatively small. Conversely, when the d-th coefficient of the n-th sample has a small masking threshold, the corresponding weight $H_{d,n}$ may be relatively large.

Figure 4:
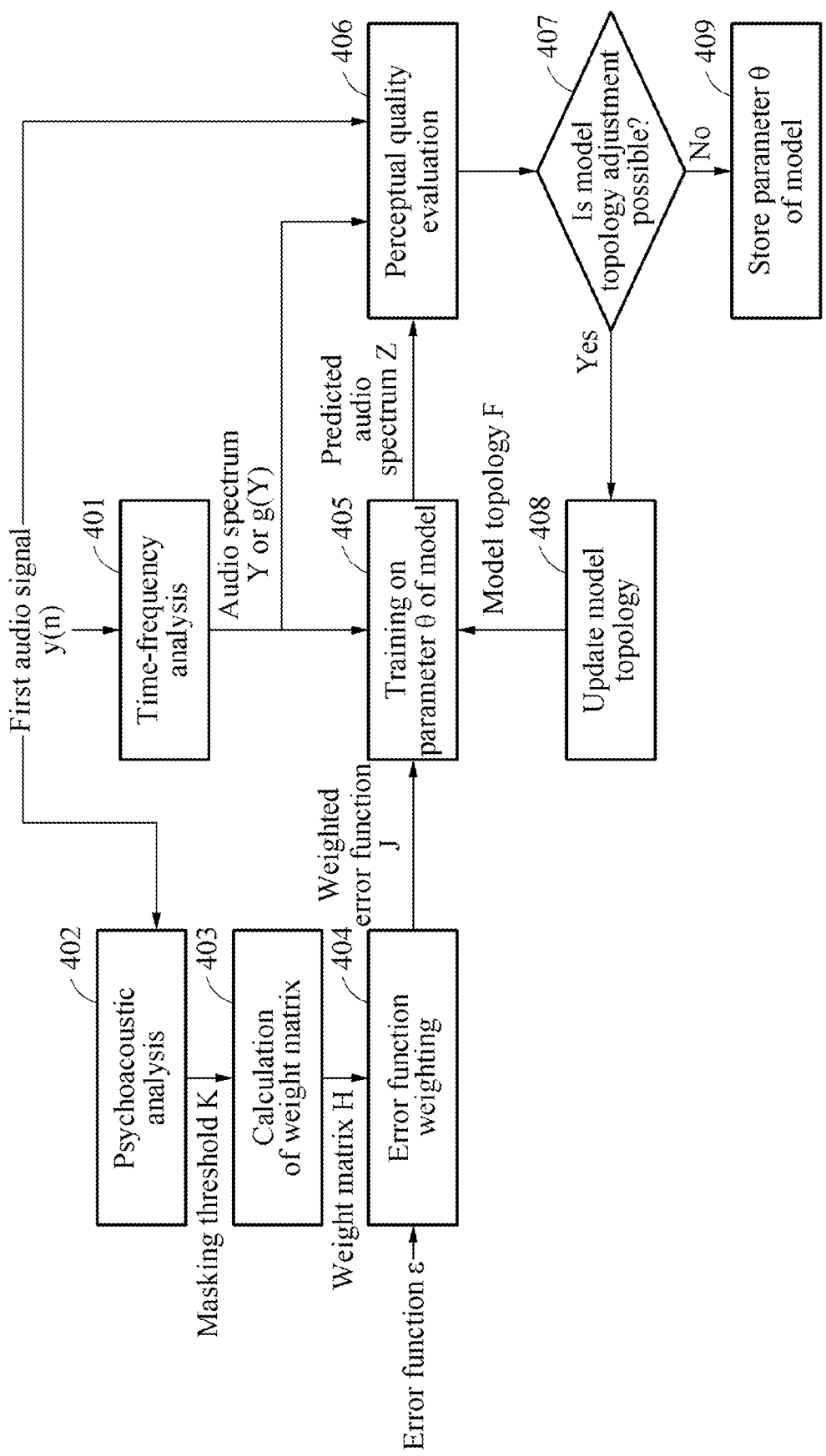
FIG. 4 is a flowchart illustrating a process of training a neural network using a weighted error function according to an example embodiment.

FIG. 4 is a flowchart illustrating a process of training a neural network using a weighted error function according to an example embodiment.

Referring to FIG. 4, a frequency spectrum of a first audio signal may be acquired with respect to an analysis frame having a preset length through a time-frequency analysis 401. The frequency spectrum may be acquired by applying a filter bank or a modified discrete cosine transform (MDCT) and acquired using other various methods.

Here, the first audio signal may be a training audio signal used for learning a parameter. Also, a preset length of analysis frame may include an analysis frame with a length between 10 milliseconds (ms) and 50 ms and include an analysis frame with another length.

Through the time-frequency analysis 401, a frequency spectrum Y of the first audio signal or a frequency spectrum $\mathcal{G}(Y)$ of the first audio signal transformed due to noise may be generated.

A masking threshold of the first audio signal may be calculated through a psychoacoustic analysis 402. For example, the masking threshold may be calculated by analyzing an auditory characteristic of the first audio signal.

A psychoacoustic analysis method may include, for example, a moving picture experts group (MPEG) psychoacoustic model (PAM)-I and an MPEG PAM-II, and include a psychoacoustic analysis based on other methods. For example, a simultaneous masking effect and a temporal masking may be used.

Using the masking threshold calculated through the psychoacoustic analysis 402, a calculation 403 may be performed to obtain a weight matrix to be applied to a frequency component of the first audio signal.

The weight matrix may include a weight to be applied to a frequency component of the first audio signal. The weight may be set to be inversely proportional to the masking threshold of the first audio signal and proportional to a magnitude of the frequency component of the first audio signal. For example, the weight may be determined based on a signal-to-mask ratio (SMR). The SMR may be a ratio between the masking threshold and the magnitude of the frequency component of the first audio signal.

A weight $H_{d,n}$ of a weight matrix associated with a frequency component $Y_{d,n}$ of the first audio signal may be set to inversely proportional to a corresponding masking threshold and proportional to a magnitude of the frequency component.

When the masking threshold in the time frequency bins (d,n) is represented in decibels $K_{d,n}$, each weight of the weight matrix may be expressed as shown in Equation 12.

In an example, a linear scale conversion or a log scale conversion between the masking threshold and the weight may be included, and other scale conversions may also be included.

$$H_{d,n} \propto \log_a(Y_{d,n}^2/10^{0.1 K_{d,n}}+1) \quad \text{[Equation 12]}$$

A preset error function ε may be used to generate a weighted error function through an error function weighting 404. The weighted error function as shown in Equation 11 may be used for training on a parameter of a model by applying a weight.

The model may include a neural network. The neural network may include, for example, an autoencoder. Also, the model may include a topology. The topology of the model may include an input layer, at least one hidden layer, an output layer, and nodes included in each layer.

A training 405 on a parameter Θ of a model may be performed using the weighted error function. For example, a training may be performed on a topology of an initial model, and an audio spectrum Z predicted using a topology of a model on which the training is completed may be output.

The predicted audio spectrum Z may be generated by applying a parameter of a model trained on the frequency spectrum Y of the first audio signal or the frequency spectrum $g(Y)$ of the first audio signal transformed due to noise A perceptual quality evaluation 406 may be performed by comparing the predicted audio spectrum Z to the first audio signal y(n) or the frequency spectrum Y of the first audio.

The perceptual quality evaluation may include, for example, an objective evaluation such as a perceptual evaluation of speech quality (PESQ), a perceptual objective listening quality assessment (POLQA), and a perceptual evaluation of audio quality (PEAQ), or a subjective evaluation such as a mean opinion score (MOS) and multiple stimuli with hidden reference and anchor (MUSHRA). A type of perceptual quality evaluation is not limited thereto and thus, includes other various quality evaluations.

The perceptual quality evaluation 406 may be a quality evaluation on a currently trained model. Based on the quality evaluation, whether a preset quality and a model requirement such as a complexity of a model are satisfied may be determined. Also, based on the quality evaluation, whether a model topology such as the complexity of the model is adjustable may be determined. The complexity of the model may have a positive relationship with the number of hidden layers and the number of nodes.

When it is determined that an adjustment of the topology of the model is not possible or needed in operation 407, a currently learned parameter of the model may be stored and the learning may be terminated. In this example, a determination about whether the adjustment of the topology of the model is possible may vary based on a field to which the model is to be applied and a requirement for the model.

When it is determined that the adjustment of the topology of the model is possible in operation 407, the topology of the model may be updated in operation 408 and the aforementioned process for learning may be repeated. In this example, a determination about whether the adjustment of the topology of the model is possible may vary based on a field to which the model is to be applied and a requirement for the model.

In an example, when a quality requirement is not satisfied, the topology of the model may be adjusted such that a complexity of the model increases and a process for learning the parameter may be repeated. When determining whether the topology is adjustable, the parameter may be re-learned using a complexity-increased model in response to a result of a perceptual quality evaluation not satisfying a preset quality requirement. When the quality requirement is not satisfied, and when the complexity of the model does not increase, a currently learned parameter of the model may be stored and the process for learning may be terminated.

In another example, when a quality requirement is satisfied, the topology of the model may be adjusted such that a complexity of the model is reduced and a process for learning the parameter may be repeated. When determining whether the topology is adjustable, the parameter may be re-learned using a complexity-reduced model in response to a result of the perceptual quality evaluation satisfying a preset quality requirement.

In an example embodiment, a signal processing may be performed on an input audio signal based on a parameter of a trained model. In this instance, the signal processing may include compression, noise removal, encoding, and decoding but not limited thereto.

Figure 5:
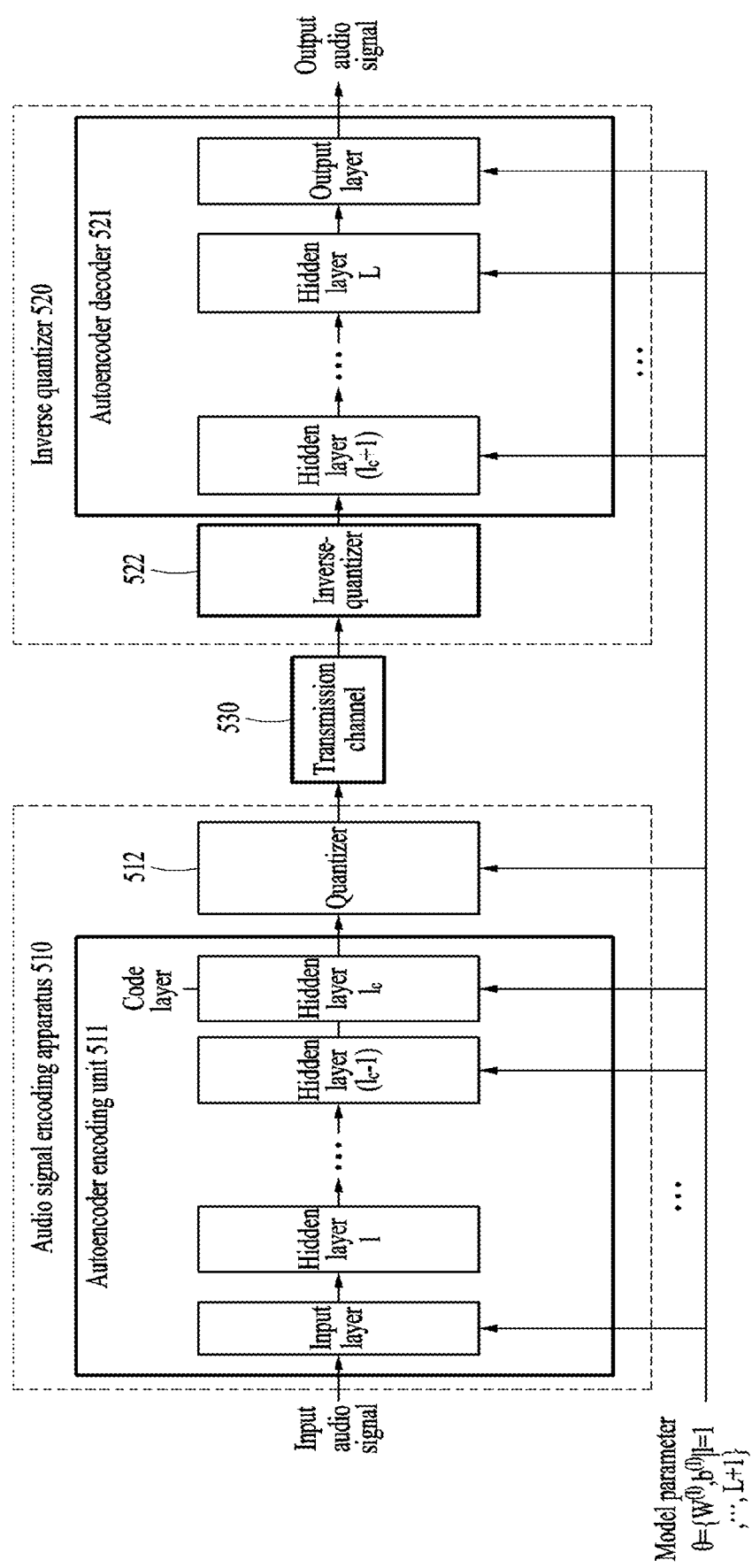
FIG. 5 is a diagram illustrating an audio signal encoding apparatus, a channel, and an audio signal decoding apparatus according to an example embodiment.

FIG. 5 is a diagram illustrating an audio signal encoding apparatus, a channel, and an audio signal decoding apparatus according to an example embodiment.

Referring to FIG. 5, an audio signal encoding apparatus 510 to which a neural network is applied may receive an input audio signal. For example, a model learned using the neural network may be applied to the audio signal encoding apparatus 510. Here, the neural network may include an autoencoder.

The audio signal encoding apparatus 510 may include an autoencoder encoding unit 511 and a quantizer 512. The autoencoder encoding unit 511 may include layers between an input layer and a code layer, the code layer being a $l_c$-th hidden layer.

The audio signal encoding apparatus 510 may generate a latent vector having a reduced dimension, of the received input audio signal based on a parameter of a hidden layer learned using the neural network. The generated latent vector may be quantized or encoded by the quantizer 512 to be output as a bitstream. The quantizer 512 may perform binarization for transmitting the bitstream through a transmission channel.

The output bitstream may be transmitted to an audio signal decoding apparatus 520 through a transmission channel 530.

The audio signal decoding apparatus 520 may include an autoencoder decoding unit 521 and an inverse quantizer 522.

The autoencoder decoding unit 521 may include layers between a $l_c+1$-th hidden layer to an output layer.

The audio signal decoding apparatus 520 may restore the latent vector by inverse-quantizing the bitstream transmitted through the transmission channel 530 in the inverse quantizer 522. Using the restored latent vector, the autoencoder decoding unit 521 may decode an output audio signal or calculate the output audio signal. In this example, the inverse quantizer 522 may perform binarization on the bitstream.

Parameters used for the autoencoder encoding unit 511 and the autoencoder decoding unit 521 may be parameters learned in the example of FIG. 4. The learned parameter is described with reference to FIG. 4.

In an aspect, it is possible to provide an enhanced quality of an audio signal with the same model complexity using a perceptually weighted error function using human auditory characteristics. Also, it is possible to provide the same quality of the audio signal with a lower model complexity. Thus, the present disclosure is applicable to an audio codec for audio signal compression and decompression.

Figure 6:
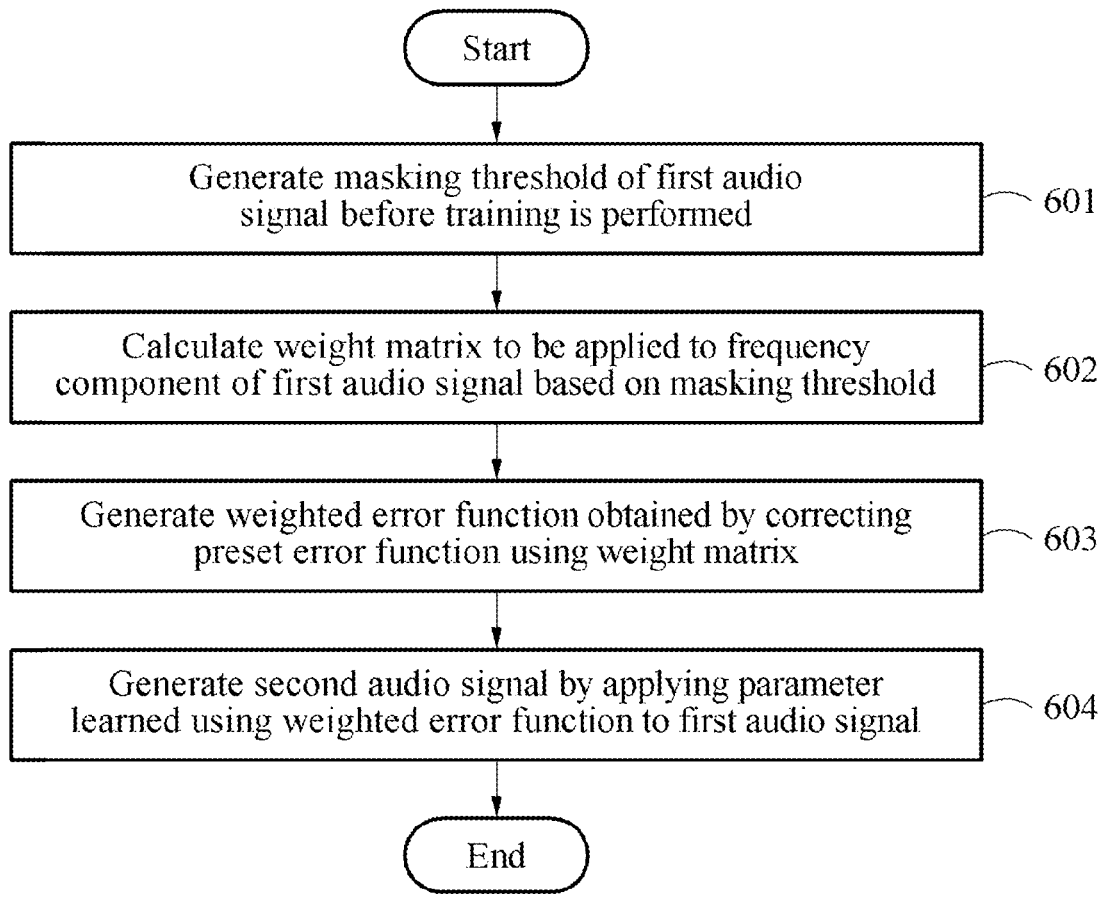
FIG. 6 is a flowchart illustrating a process of training a neural network applied to an audio signal encoding method using an audio signal encoding apparatus according to an example embodiment.

FIG. 6 is a flowchart illustrating a process of training a neural network applied to an audio signal encoding method using an audio signal encoding apparatus according to an example embodiment.

In operation 601, an audio signal encoding apparatus may generate a masking threshold of a first audio signal before training is performed. Here, the first audio signal may be a training audio signal used for learning a neural network.

The masking threshold may be calculated by analyzing an auditory characteristic of the first audio signal. A psychoacoustic analysis method may include, for example, an MPEG PAM-I and an MPEG PAM-II, and include a psychoacoustic analysis based on other methods. For example, a simultaneous masking effect and a temporal masking may be used.

In operation 602, the audio signal encoding apparatus may calculate a weight matrix to be applied to a frequency component of the first audio signal based on the generated masking threshold. The weight matrix may include a weight to be applied to a frequency component of the first audio signal. The weight may be set to be inversely proportional to the masking threshold of the first audio signal and proportional to a magnitude of the frequency component of the first audio signal. For example, the weight may be determined based on an SMR. The SMR may be a ratio between the masking threshold and the magnitude of the frequency component of the first audio signal.

A weight $H_{d,n}$ of a weight matrix associated with a frequency component $Y_{d,n}$ of the first audio signal may be set to inversely proportional to a corresponding masking threshold and proportional to a magnitude of the frequency component.

In operation 603, the audio signal encoding apparatus may generate a weighted error function obtained by correcting a preset error function using the weight matrix. The weighted error function may be used for training on a parameter of a model by applying a weight.

The model may include a neural network. The neural network may include, for example, an autoencoder. Also, the model may include a topology. The topology of the model may include an input layer, at least one hidden layer, an output layer, and nodes included in each layer.

In operation 604, the audio signal encoding apparatus may generate a second audio signal by applying a parameter learned using the weighted error function to the first audio signal. The parameter of the model may be learned using the weighted error function. For example, a training may be performed on a topology of an initial model, and an audio signal predicted using a topology of a model on which the training is completed based on a repetitive learning algorithm may be output. The predicted audio signal may be the second audio signal.

A frequency spectrum of the second audio signal may be generated by applying a parameter of a model trained on a frequency spectrum of the first audio signal or a frequency spectrum of the first audio signal transformed due to noise.

The second audio signal may be compared to the first audio signal, so that a perceptual quality evaluation is performed. The perceptual quality evaluation may include, for example, an objective evaluation such as PESQ, POLQA, and PEAQ, or a subjective evaluation such as MOS and MUSHRA. A type of perceptual quality evaluation is not limited thereto and thus, includes other various quality evaluations.

The perceptual quality evaluation may be a quality evaluation on a currently trained model. Based on the quality evaluation, whether a preset quality and a model requirement such as a complexity of a model are satisfied may be determined. Also, based on the quality evaluation, whether a model topology such as the complexity of the model is adjustable may be determined. The complexity of the model may have a positive relationship with the number of hidden layers and the number of nodes.

When it is determined that an adjustment of the topology of the model is not possible or needed, a currently learned parameter of the model may be stored and the learning may be terminated. In this example, a determination about whether the adjustment of the topology of the model is possible may vary based on a field to which the model is to be applied and a requirement for the model.

When it is determined that the topology of the model is adjustable, the topology of the model may be updated and the foregoing process for training may be repeated. In this example, a determination about whether the adjustment of the topology of the model is possible may vary based on a field to which the model is to be applied and a requirement for the model.

In an example, when a quality requirement is not satisfied, the topology of the model may be adjusted such that a complexity of the model increases and a process for learning the parameter may be repeated. When determining whether the topology is adjustable, the parameter may be re-learned using a complexity-increased model in response to a result of a perceptual quality evaluation not satisfying a preset quality requirement. When the quality requirement is not satisfied, and when the complexity of the model does not increase, a currently learned parameter of the model may be stored and the process for learning may be terminated.

In another example, when a quality requirement is satisfied, the topology of the model may be adjusted such that a complexity of the model is reduced and a process for learning the parameter may be repeated. When determining whether the topology is adjustable, the parameter may be re-learned using a complexity-reduced model in response to a result of the perceptual quality evaluation satisfying a preset quality requirement.

In an example embodiment, a signal processing may be performed on a first audio signal based on a parameter of a trained model. In this instance, the signal processing may include compression, noise removal, encoding, and decoding but not limited thereto.

Figure 7:
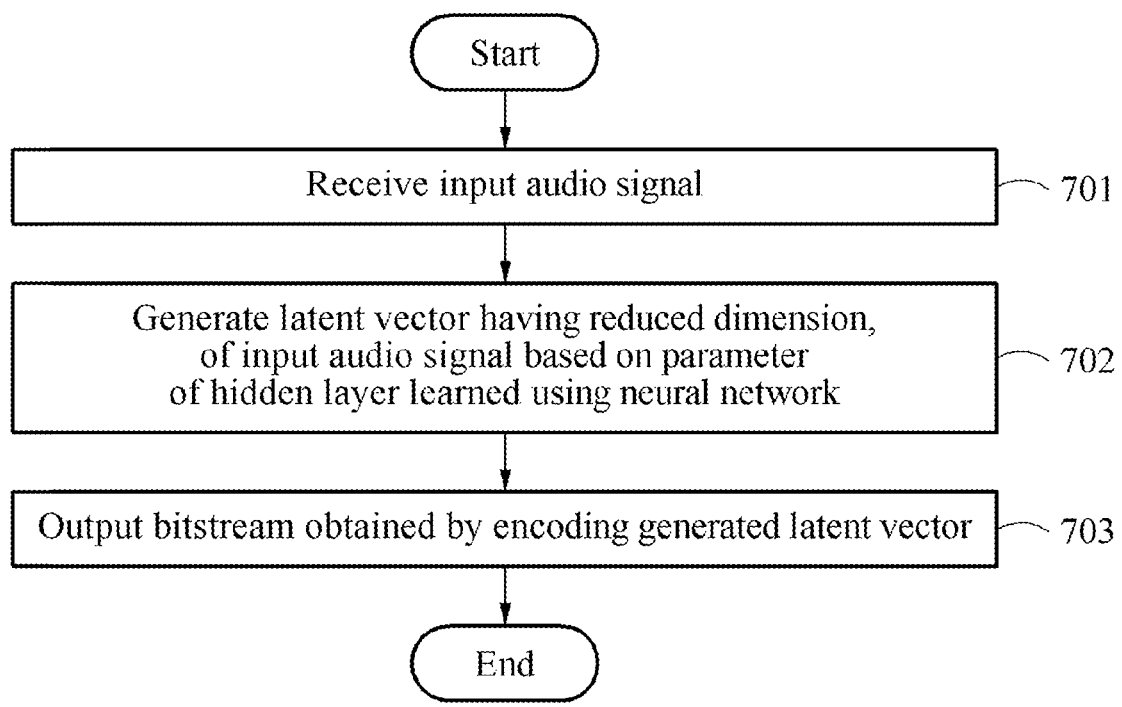
FIG. 7 is a flowchart illustrating an audio signal encoding method performed by an audio signal encoding apparatus to which a neural network is applied according to an example embodiment.

FIG. 7 is a flowchart illustrating an audio signal encoding method performed by an audio signal encoding apparatus to which a neural network is applied according to an example embodiment.

In operation 701, the audio signal encoding apparatus may receive an input audio signal. In this example, a model learned using a neural network may be applied to the audio signal encoding apparatus. Here, the neural network may include an autoencoder.

In operation 702, the audio signal encoding apparatus may generate a latent vector having a reduced dimension, of the input audio signal based on a parameter of a hidden layer learned using the neural network. Since the foregoing description of the process of learning the parameter of the hidden layer is also applicable here, repeated description will be omitted.

The latent vector may be generated based on the learned parameter when an adjustment of a topology of a model including a number of hidden layers and a number of nodes is not possible or needed. In this example, a determination about whether the adjustment of the topology of the model is possible may vary based on a field to which the model is to be applied and a requirement for the model.

The latent vector may be generated based on a parameter re-learned by applying an adjusted topology when the topology of the model including the number of hidden layers and the number of nodes is adjustable. In this example, a determination about whether the adjustment of the topology of the model is possible may vary based on a field to which the model is to be applied and a requirement for the model.

In an example, when a quality requirement is not satisfied, the topology of the model may be adjusted such that a complexity of the model increases and a process for learning the parameter may be repeated. When determining whether the topology is adjustable, the parameter may be re-learned using a complexity-increased model in response to a result of a perceptual quality evaluation not satisfying a preset quality requirement. When the quality requirement is not satisfied, and when the complexity of the model does not increase, a currently learned parameter of the model may be stored and the process for learning may be terminated.

In another example, when a quality requirement is satisfied, the topology of the model may be adjusted such that a complexity of the model is reduced and a process for learning the parameter may be repeated. When determining whether the topology is adjustable, the parameter may be re-learned using a complexity-reduced model in response to a result of the perceptual quality evaluation satisfying a preset quality requirement.

In operation 703, the audio signal encoding apparatus may output a bitstream obtained by encoding a generated latent vector. The latent vector may be quantized or encoded to be transmitted through a transmitted channel and output in a form of bitstream.

Figure 8:
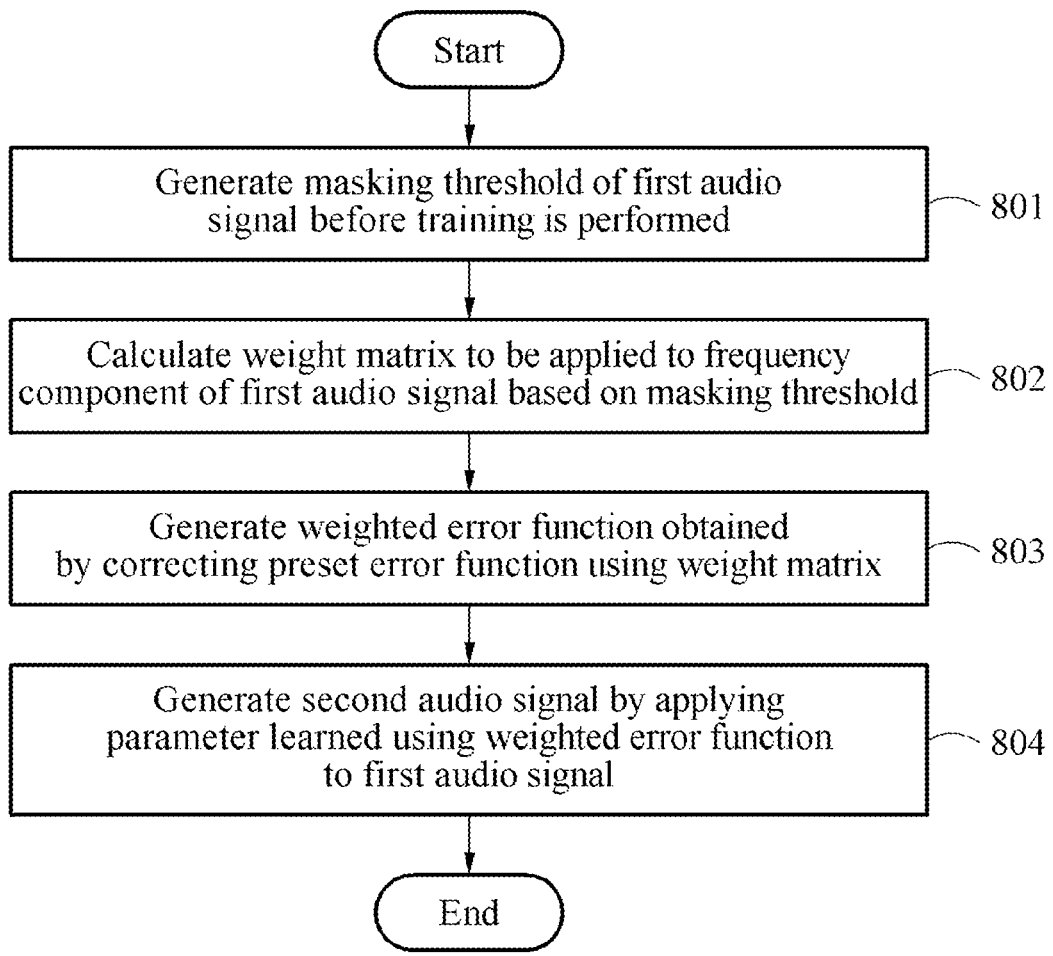
FIG. 8 is a flowchart illustrating a process of training a neural network applied to an audio signal decoding method using an audio signal decoding apparatus according to an example embodiment.

FIG. 8 is a flowchart illustrating a process of training a neural network applied to an audio signal decoding method using an audio signal decoding apparatus according to an example embodiment.

In operation 801, an audio signal decoding apparatus may generate a masking threshold of a first audio signal before training is performed. Here, the first audio signal may be a training audio signal used for learning a neural network.

The masking threshold may be calculated by analyzing an auditory characteristic of the first audio signal. A psychoacoustic analysis method may include, for example, an MPEG PAM-I and an MPEG PAM-II, and include a psychoacoustic analysis based on other methods. For example, a simultaneous masking effect and a temporal masking may be used.

In operation 802, the audio signal decoding apparatus may calculate a weight matrix to be applied to a frequency component of the first audio signal based on the generated masking threshold. The weight matrix may include a weight to be applied to a frequency component of the first audio signal. The weight may be set to be inversely proportional to the masking threshold of the first audio signal and proportional to a magnitude of the frequency component of the first audio signal. For example, the weight may be determined based on an SMR. The SMR may be a ratio between the masking threshold and the magnitude of the frequency component of the first audio signal.

A weight $H_{d,n}$ of a weight matrix associated with a frequency component $Y_{d,n}$ of the first audio signal may be set to inversely proportional to a corresponding masking threshold and proportional to a magnitude of the frequency component.

In operation 803, the audio signal decoding apparatus may generate a weighted error function obtained by correcting a preset error function using the weight matrix. The weighted error function may be used for training on a parameter of a model by applying a weight.

The model may include a neural network. The neural network may include, for example, an autoencoder. Also, the model may include a topology. The topology of the model may include an input layer, at least one hidden layer, an output layer, and nodes included in each layer.

In operation 804, the audio signal decoding apparatus may generate a second audio signal by applying a parameter learned using the weighted error function to the first audio signal. The parameter of the model may be learned using the weighted error function. For example, a training may be performed on a topology of an initial model, and an audio signal predicted using a topology of a model on which the training is completed based on a repetitive learning algorithm may be output. The predicted audio signal may be the second audio signal.

A frequency spectrum of the second audio signal may be generated by applying a parameter of a model trained on a frequency spectrum of the first audio signal or a frequency spectrum of the first audio signal transformed due to noise.

The second audio signal may be compared to the first audio signal, so that a perceptual quality evaluation is performed. The perceptual quality evaluation may include, for example, an objective evaluation such as a PESQ, a POLQA, and a PEAQ, or a subjective evaluation such as an MOS and MUSHRA. A type of perceptual quality evaluation is not limited thereto and thus, includes other various quality evaluations.

The perceptual quality evaluation may be a quality evaluation on a currently trained model. Based on the quality evaluation, whether a preset quality and a model requirement such as a complexity of a model are satisfied may be determined. Also, based on the quality evaluation, whether a model topology such as the complexity of the model is adjustable may be determined. The complexity of the model may have a positive relationship with the number of hidden layers and the number of nodes.

When it is determined that an adjustment of the topology of the model is not possible or needed, a currently learned parameter of the model may be stored and the learning may be terminated. In this example, a determination about whether the adjustment of the topology of the model is possible may vary based on a field to which the model is to be applied and a requirement for the model.

When it is determined that the topology of the model is adjustable, the topology of the model may be updated and the aforementioned process for learning may be repeated. In this example, a determination about whether the adjustment of the topology of the model is possible may vary based on a field to which the model is to be applied and a requirement for the model.

In an example, when a quality requirement is not satisfied, the topology of the model may be adjusted such that a complexity of the model increases and a process for learning the parameter may be repeated. When determining whether the topology is adjustable, the parameter may be re-learned using a complexity-increased model in response to a result of a perceptual quality evaluation not satisfying a preset quality requirement. When the quality requirement is not satisfied, and when the complexity of the model does not increase, a currently learned parameter of the model may be stored and the process for learning may be terminated.

In another example, when a quality requirement is satisfied, the topology of the model may be adjusted such that a complexity of the model is reduced and a process for learning the parameter may be repeated. When determining whether the topology is adjustable, the parameter may be re-learned using a complexity-reduced model in response to a result of the perceptual quality evaluation satisfying a preset quality requirement.

In an example embodiment, a signal processing such as compression, noise removal, encoding, and decoding may be performed on an input audio signal based on a parameter of a trained model. In this instance, a type of the signal processing is not limited thereto.

In an example embodiment, a signal processing may be performed on a first audio signal based on a parameter of a trained model. In this instance, the signal processing may include compression, noise removal, encoding, and decoding but not limited thereto.

Figure 9:
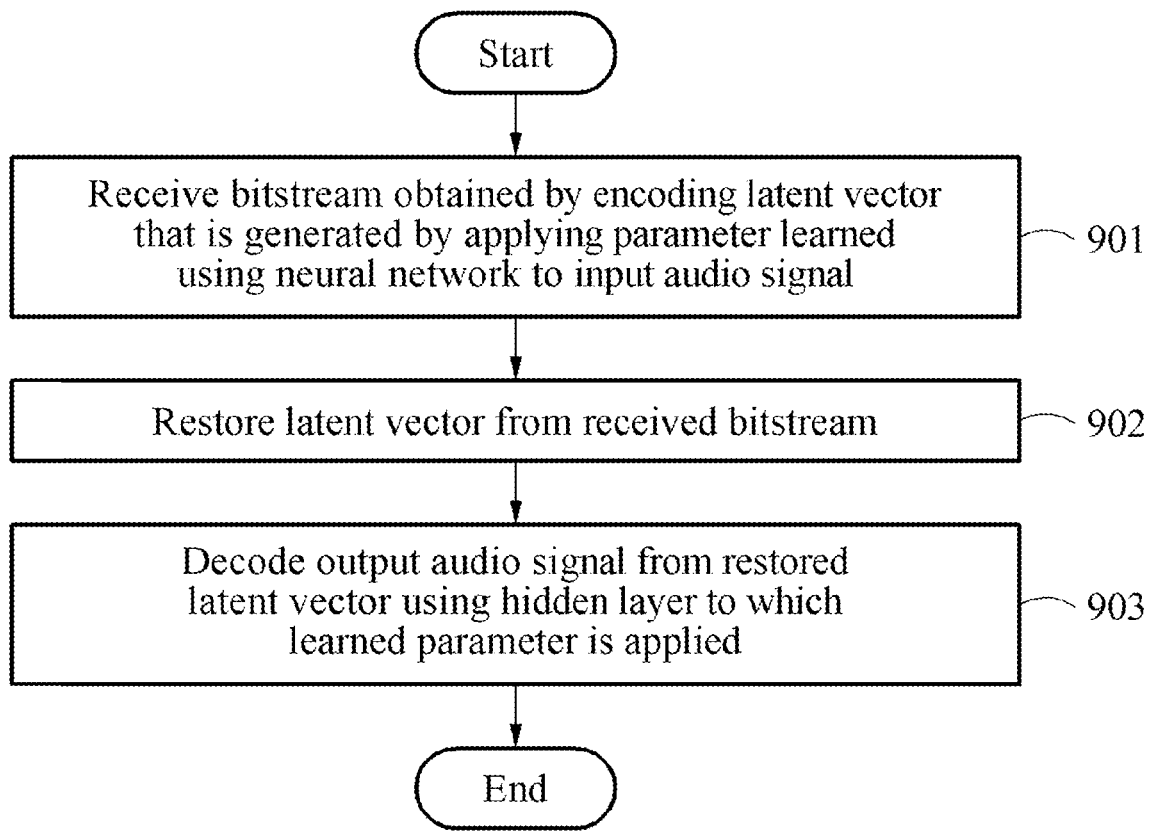
FIG. 9 is a flowchart illustrating an audio signal decoding method performed by an audio signal decoding apparatus to which a neural network is applied according to an example embodiment.

FIG. 9 is a flowchart illustrating an audio signal decoding method performed by an audio signal decoding apparatus to which a neural network is applied according to an example embodiment.

In operation 901, the audio signal decoding apparatus may receive a bitstream obtained by encoding a latent vector. The latent vector may be generated by applying a parameter learned using a neural network to an input audio signal. In this example, a model learned using a neural network may be applied to the audio signal decoding apparatus. Here, the neural network may include an autoencoder.

In operation 902, the audio signal decoding apparatus may restore the latent vector from the received bitstream. The bitstream is generated by quantizing or encoding the latent vector and transmitted through a transmission channel.

In operation 903, the audio signal decoding apparatus may decode an output audio signal from the restored latent vector using a hidden layer to which a learned parameter is applied. Since the foregoing description of the process of learning the parameter of the hidden layer is also applicable here, repeated description will be omitted.

The latent vector may be generated based on the learned parameter when an adjustment of a topology of a model including a number of hidden layers and a number of nodes is not possible or needed. In this example, a determination about whether the adjustment of the topology of the model is possible may vary based on a field to which the model is to be applied and a requirement for the model.

The latent vector may be generated based on a parameter re-learned by applying an adjusted topology when the topology of the model including the number of hidden layers and the number of nodes is adjustable. In this example, a determination about whether the adjustment of the topology of the model is possible may vary based on a field to which the model is to be applied and a requirement for the model.

In an example, when a quality requirement is not satisfied, the topology of the model may be adjusted such that a complexity of the model increases and a process for learning the parameter may be repeated. When determining whether the topology is adjustable, the parameter may be re-learned using a complexity-increased model in response to a result of a perceptual quality evaluation not satisfying a preset quality requirement. When the quality requirement is not satisfied, and when the complexity of the model does not increase, a currently learned parameter of the model may be stored and the process for training may be terminated.

In another example, when a quality requirement is satisfied, the topology of the model may be adjusted such that a complexity of the model is reduced and a process for learning the parameter may be repeated. When determining whether the topology is adjustable, the parameter may be re-learned using a complexity-reduced model in response to a result of the perceptual quality evaluation satisfying a preset quality requirement.

Figure 10:
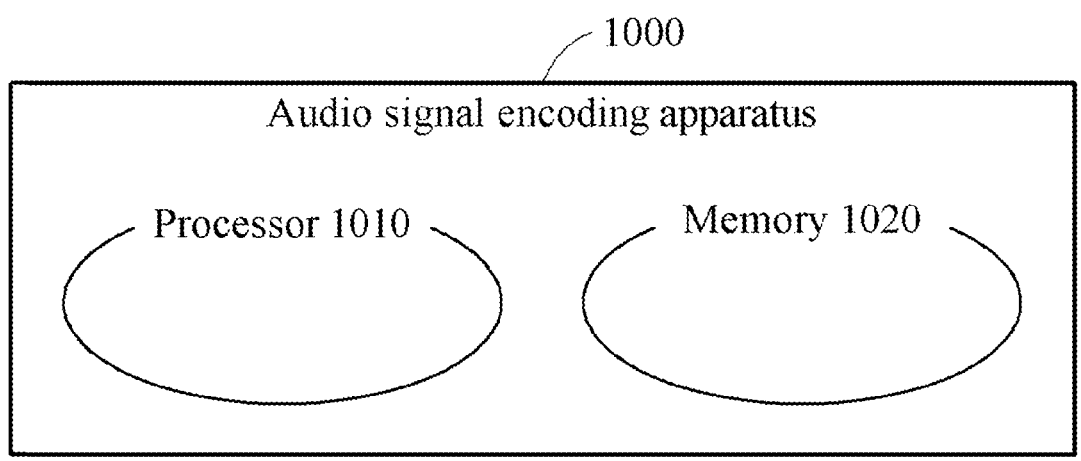
FIG. 10 is a diagram illustrating an audio signal encoding apparatus to which a neural network is applied according to an example embodiment.

FIG. 10 is a diagram illustrating an audio signal encoding apparatus to which a neural network is applied according to an example embodiment.

An audio signal encoding apparatus 1000 may include a processor 1010 and a memory 1020. The memory 1020 may include at least one instruction to be executed by a processor.

The processor 1010 may receive an input audio signal. In this example, a model learned using a neural network may be applied to the processor 1010 of the audio signal encoding apparatus 1000. Here, the neural network may include an autoencoder.

The processor 1010 of the audio signal encoding apparatus 1000 may generate a latent vector having a reduced dimension, of the input audio signal based on a parameter of a hidden layer learned using the neural network. Since the foregoing description of the process of learning the parameter of the hidden layer is also applicable here, repeated description will be omitted.

The latent vector may be generated based on the learned parameter when an adjustment of a topology of a model including a number of hidden layers and a number of nodes is not possible or needed. In this example, a determination about whether the adjustment of the topology of the model is possible may vary based on a field to which the model is to be applied and a requirement for the model.

The latent vector may be generated based on a parameter re-learned by applying an adjusted topology when the topology of the model including the number of hidden layers and the number of nodes is adjustable. In this example, a determination about whether the adjustment of the topology of the model is possible may vary based on a field to which the model is to be applied and a requirement for the model.

In an example, when a quality requirement is not satisfied, the topology of the model may be adjusted such that a complexity of the model increases and a process for learning the parameter may be repeated. When determining whether the topology is adjustable, the parameter may be re-learned using a complexity-increased model in response to a result of a perceptual quality evaluation not satisfying a preset quality requirement. When the quality requirement is not satisfied, and when the complexity of the model does not increase, a currently learned parameter of the model may be stored and the process for learning may be terminated.

In another example, when a quality requirement is satisfied, the topology of the model may be adjusted such that a complexity of the model is reduced and a process for learning the parameter may be repeated. When determining whether the topology is adjustable, the parameter may be re-learned using a complexity-reduced model in response to a result of the perceptual quality evaluation satisfying a preset quality requirement.

The processor 1010 of the audio signal encoding apparatus 1000 may output a bitstream obtained by encoding a generated latent vector. The latent vector may be quantized or encoded to be transmitted through a transmitted channel and output in a form of bitstream.

Figure 11:
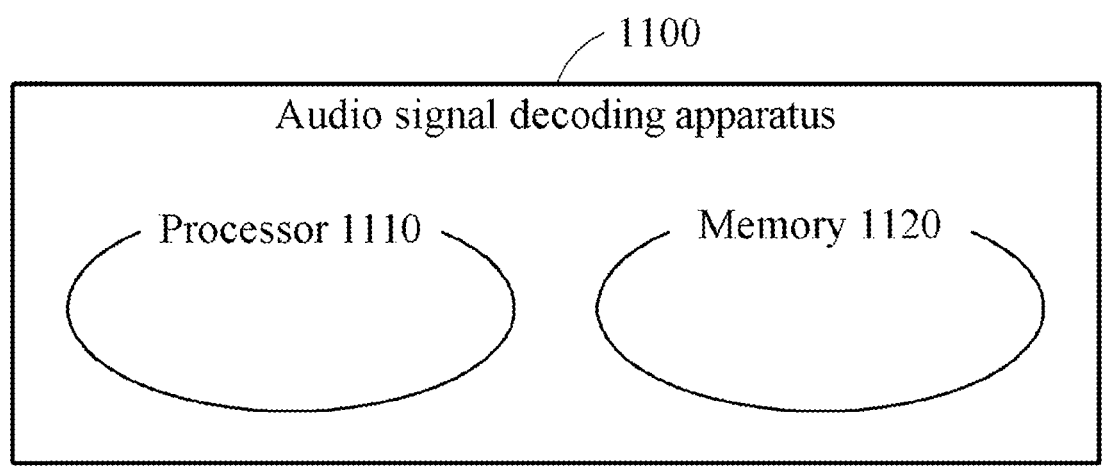
FIG. 11 is a diagram illustrating an audio signal decoding apparatus to which a neural network is applied according to an example embodiment.

FIG. 11 is a diagram illustrating an audio signal decoding apparatus to which a neural network is applied according to an example embodiment.

An audio signal decoding apparatus 1100 may include a processor 1110 and a memory 1120. The memory 1120 may include at least one instruction to be executed by a processor 1110.

The processor 1110 may receive a bitstream obtained by encoding a latent vector. The latent vector may be generated by applying a parameter learned using a neural network to an input audio signal. In this example, a model learned using a neural network may be applied to the processor 1110 the audio signal decoding apparatus 1100. Here, the neural network may include an autoencoder.

The processor 1110 of the audio signal decoding apparatus 1100 may restore the latent vector from the received bitstream. The bitstream is generated by quantizing or encoding the latent vector and transmitted through a transmission channel.

The processor 1110 of the audio signal decoding apparatus 1100 may decode an output audio signal from the restored latent vector using a hidden layer to which a learned parameter is applied. Since the foregoing description of the process of learning the parameter of the hidden layer is also applicable here, repeated description will be omitted.

The latent vector may be generated based on the learned parameter when an adjustment of a topology of a model including a number of hidden layers and a number of nodes is not possible or needed. In this example, a determination about whether the adjustment of the topology of the model is possible may vary based on a field to which the model is to be applied and a requirement for the model.

The latent vector may be generated based on a parameter re-learned by applying an adjusted topology when the topology of the model including the number of hidden layers and the number of nodes is adjustable. In this example, a determination about whether the adjustment of the topology of the model is possible may vary based on a field to which the model is to be applied and a requirement for the model.

In an example, when a quality requirement is not satisfied, the topology of the model may be adjusted such that a complexity of the model increases and a process for learning the parameter may be repeated. When determining whether the topology is adjustable, the parameter may be re-learned using a complexity-increased model in response to a result of a perceptual quality evaluation not satisfying a preset quality requirement. When the quality requirement is not satisfied, and when the complexity of the model does not increase, a currently learned parameter of the model may be stored and the process for learning may be terminated.

In another example, when a quality requirement is satisfied, the topology of the model may be adjusted such that a complexity of the model is reduced and a process for learning the parameter may be repeated. When determining whether the topology is adjustable, the parameter may be re-learned using a complexity-reduced model in response to a result of the perceptual quality evaluation satisfying a preset quality requirement.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner.

The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A training method of a neural network, that is applied to an audio signal encoding method using an audio signal encoding apparatus, the training method comprising:
    generating a masking threshold of a first audio signal before training is performed;
    calculating a weight matrix to be applied to a frequency component of the first audio signal based on the masking threshold;
    generating a weighted error function obtained by correcting a preset error function using the weight matrix; and
    generating a second audio signal by applying a parameter learned using the weighted error function to the first audio signal.

2. The training method of claim 1, wherein the weight matrix includes a weight to be applied to the frequency component of the first audio signal, and the weight is set to be inversely proportional to the masking threshold of the first audio signal and proportional to a magnitude of the frequency component of the first audio signal.

3. The training method of claim 1, further comprising:
    comparing the second audio signal to the first audio signal and performing a perceptual quality evaluation.

4. The training method of claim 3, wherein the perceptual quality evaluation includes an objective evaluation based on a perceptual evaluation of speech quality (PESQ), a perceptual objective listening quality assessment (POLQA), or a perceptual evaluation of audio quality (PEAQ).

5. The training method of claim 3, wherein the perceptual quality evaluation includes a subjective evaluation based on a mean opinion score (MOS) or multiple stimuli with hidden reference and anchor (MUSHRA).

6. The training method of claim 3, wherein the neural network determines whether a topology, a structural complexity, or the level of quantization to represent the model parameters, included in a model is adjustable based on the perceptual quality evaluation.

7. The training method of claim 6, wherein when determining whether the topology is adjustable, the neural network re-learns a parameter using a complexity-increased model in response to a result of the perceptual quality evaluation not satisfying a preset quality requirement and, in response to a result of the perceptual quality evaluation satisfying a preset quality requirement, re-learns a parameter using a complexity-reduced model in the quality requirement.

* * * * *